March 19, 1957 M. GITTERMAN 2,786,086
RECOVERY OF METAL HALIDE CATALYST
Filed Dec. 28, 1953
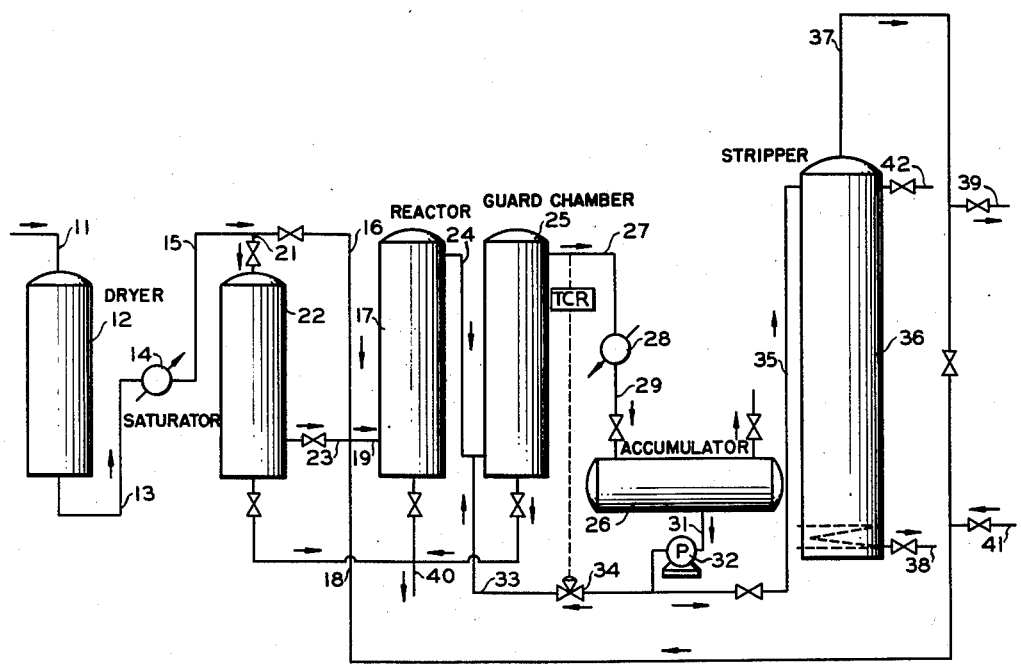
INVENTOR.
MORRIS GITTERMAN
BY
ATTORNEYS United States Patent Office 2,786,086
Patented Mar. 19, 1957

2,786,086
RECOVERY OF METAL HALIDE CATALYST

Morris Gitterman, Bartlesville, Okla., assignor to Phillips Petroleum Company, a corporation of Delaware Application December 28, 1953, Serial No. 400,528

10 Claims. (Cl. 260—683.5)

This invention relates to hydrocarbon conversions using a metal halide catalyst. In one of its more specific aspects, it relates to the recovery of metal halide catalyst. In another of its more specific aspects, it relates to the removal of metal halide catalyst from the reaction product stream.

Catalytic conversion processes such as isomerization and alkylation of low boiling hydrocarbons, particularly members of the paraffin series, such as butanes and pentanes, having long been of great commercial interest. These reactions are to a considerable extent catalyzed by the so-called Friedel-Crafts type metal halide catalysts, among the better known of which may be mentioned the aluminum halides, particularly aluminum chloride and aluminum bromide. Zinc chloride, ferric chloride, boron fluoride, zirconium tetrachloride, and other polyvalent metal halides are also illustrative of the catalysts which are useful in such processes. Aluminum chloride has received the greatest commercial acceptance because of its activity, relatively low cost, and availability.

A number of difficulties and disadvantages have become apparent during operation of such catalytic conversion systems. One difficulty has been in the maintenance of the metal halide catalyst in the reaction zone where vapor phase operations are carried out, because of the fact that the metal halide catalyst volatilizes and sublimes and has a tendency to be carried out of the reaction zone in the vapors of the reaction product. This has to some extent been remedied by the impregnation and sorption of the metal halide vapors in porous carriers and the use of catalyst beds made of these porous carriers containing a metal halide has served to minimize the release of metal halide vapors when care is taken not to introduce too much metal halide onto the porous carrier. However, in large scale commercial units, it has been next to impossible to keep the metal halide catalyst from carrying over with the gaseous reaction product. Carry-over of the metal halide catalyst results in an accumulation of the metal halide in the condenser and in other equipment downstream of the reaction chamber. Such carry-over often results in plugging of the equipment or in an increased pressure drop through the condenser, and contributes to corrosion problems. An attempt has been made to meet this difficulty by tying in a so-called guard chamber immediately downstream of the reaction chamber. Such a guard chamber is normally packed with an absorbent material, such as "Porocel," or the like, to entrain and/or absorb the metal halide. Operation with such a chamber, however, has still had its difficulties, since the guard chamber inlet stream is the highest temperature stream in the system. Thus, the temperature within the guard chamber is insufficiently low to permit any large amount of deposition of the metal halide catalyst in the guard chamber beds, thus defeating the purpose of the guard chamber.

The following objects of this invention will be obtained by the various aspects of the invention.

An object of this invention is to provide an improved means for removing metal halide catalyst from the reaction product stream of a catalytic conversion process using such a catalyst. Another object of the invention is to provide a method for removing metal halide catalyst from the reaction product stream of a catalytic conversion system using such a catalyst. Another object of the invention is to provide means for cooling the gaseous effluent from the reactor without causing deposition of metal halide catalyst in the effluent line. Another object of the invention is to provide a method for cooling gaseous effluent from the reactor without causing deposition of metal halide catalyst in the effluent line.

Broadly speaking, this invention comprises utilization of liquid hydrocarbons in the boiling range of those converted or of corresponding products, such as liquid butanes, in the conversion of normal butane, as a quench for the gaseous effluent intermediate the reactor and the guard chamber to reduce the temperature of the gaseous effluent to a point at which metal halide catalyst is permitted to be deposited on the absorbent material within the guard chamber without any substantial resublimation and carry-over from the chamber.

Better understanding of this invention will be apparent upon reference to the drawing which is a schematic flow diagram incorporating the improvement of this invention. In this flow diagram, certain elements of apparatus are included for the purpose of illustration but my invention is not to be limited to any particular treatment of the feed stream or to handling of the product for the recovery of various constituents therefrom.

For the purpose of illustration, this invention will be described with reference to the use of an aluminum chloride catalyst in the vapor phase isomerization of normal butane to isobutane. Normal butane from any suitable source, which may include recycled unconverted normal butane, is passed by means of conduit 11 through a drying unit 12 which contains a suitable desiccant, such as dehydrated bauxite. A plurality of such units may be used so that one may be taken off stream and regenerated as required. The dried feed is passed by means of conduit 13 through heater 14 where the feed stream is vaporized and superheated to a temperature sufficient to result in the isomerization in the reaction chamber. The heated feed is then passed by means of conduits 15, 16, and 19 into reaction chamber 17. Reaction chamber 17 is charged with an absorbent material, such as "Porocel," mixed with or impregnated with anhydrous aluminum chloride. Hydrogen chloride is introduced from conduit 18 into admixture with the heated butane feed in conduit 19, and that reaction mixture is passed in vapor phase through conduit 19 into and through reactor 17 wherein substantial conversion of normal butane to isobutane occurs. The hydrogen chloride can be introduced separately, if desired, although better mixing is obtained when the materials are mixed prior to introduction into the reactor.

Super-atmospheric pressures which permit the reaction mixture to remain in vapor phase at the temperatures employed are generally used. Reactor inlet temperatures may vary from about 175° F. to 325° F., but are generally within the range of about 220° F. to 300° F. For example, when starting with a fresh catalyst, a temperature of about 260° F. and a pressure of about 250 pounds per square inch gauge, are maintained. As the activity of the catalyst decreases, the temperature is raised to a value of about 300° F. to maintain the rate of conversion. At this point, the catalyst is replaced or reactivated. In one manner of operation, the catalyst is reactivated by shutting off the flow of hydrogen chloride and a portion of the hydrocarbon feed is passed by means of conduit 21 through a saturator 22 which is filled with lump aluminum chloride. Sufficient aluminum chloride is sublimed in this manner and passed to reactor 17 through conduits 23 and 19, wherein it is absorbed to restore the activity of the catalyst to the desired extent. The feed inlet temperature is then again lowered to 260° F., and after lining out the operation, hydrogen chloride is again introduced. The concentration of hydrogen chloride in the total feed to the reaction is usually maintained within the range of between 5 and 10 mol percent, although at times, amounts outside of this range may be suitable.

Since the isomerization reaction is exothermic, vapors leaving reaction chamber 17 are substantially above reactor inlet temperature and are passed by means of conduit 24 to guard chamber 25. As pointed out above, the temperature of this stream is normally so high that any metal halide catalyst which is absorbed on the absorbent material within chamber 25 is to a large extent resublimed and carried from the guard chamber with the gaseous product stream.

By my invention, I cool the product stream prior to its introduction into guard chamber 25 by injecting into that stream a sufficient quantity of liquid butanes to reduce the temperature of the product stream below that at which sublimation of the metal halide catalyst takes place. Ordinarily, when aluminum chloride is the catalyst utilized, it is sufficient to cool the product stream in conduit 24 to a temperature within the range of 200° F. and 220° F. The most practical source of liquid butanes for this cooling is from accumulator 26 which is connected to guard chamber 25 by means of conduit 27, cooler 28, and conduit 29. Liquid butane product is withdrawn from accumulator 26 through conduit 31 and pump 32. A portion of this stream is passed to conduit 24 through conduit 33. The liquid stream of butanes introduced into conduit 24 through conduit 33 is vaporized therein, thus removing much of the superheat from the vaporous product stream. The metal halide catalyst is removed by absorption in guard chamber 25, thus preventing deposition of the metal halide in cooler 28.

Removing the superheat from the vaporous product stream also results in improved operation of the cooler 28. As the nearly saturated vapor stream contacts the cooled tubes of the cooler, condensation takes place, insuring that practically the entire tube length is covered with a liquid hydrocarbon film. This film would tend to dissolve any aluminum halide present, thus reducing fouling of the heat transfer surface. In addition, the higher heat transfer rate resulting from condensation, as compared to desuperheating, will result in a net increase of approximately 10 percent in the effective heat transfer surface.

I prefer to control the amount of liquid butanes introduced into the conduit 24 in accordance with the temperature of the stream removed from guard chamber 25 through conduit 27. Valve 34 is provided in conduit 33. Temperature controller recorder is connected to conduit 27 and is also connected to valve 34 so as to open that valve as the temperature of the stream passing through conduit 27 rises above a predetermined maximum, such as 220° F., and so as to partially close the valve when the temperature of the stream flowing through conduit 27 falls below a predetermined minimum, such as 200° F.

The remaining portion of liquid from accumulator 26 is pumped by means of pump 32 through conduit 35 into hydrogen chloride stripper 36. Substantially all of the hydrogen chloride is taken off overhead in a hydrogen chloride-rich stream through conduit 37 in admixture with light hydrocarbons. A kettle product comprising isobutane and unconverted normal butane is removed from stripper 36 through conduit 38. This kettle product is passed to a caustic wash, not shown, for the removal of traces of hydrogen chloride and aluminum chloride, and is then fractionated by means, not shown, to recover the isobutane product and unconverted normal butane, which latter material may be recycled to conduit 11. The overhead product in conduit 37 is generally obtained as a vapor, and may be maintained in the vapor phase while being recycled to the reactor. In some cases the stream may be removed through conduit 39. a partial condensation may be obtained in fractionation means, not shown, and uncondensed hydrogen chloride-rich gas recycled through conduits 41 and 18 while the condensate is returned to stripper 36 as reflux through conduit 42.

As the conversion proceeds in reactor 17, small amounts of liquid aluminum chloride-containing sludge may be formed and accumulate in the bottom of the reactor. Limited amounts of sludge may also form in saturator 22 and in guard chamber 25. In the process operated under conditions as just described, the amount of sludge formation is quite small. Such sludge as is formed, may be removed through conduit 40.

Various modifications of this invention will be apparent to those skilled in the art upon study of the accompanying disclosure and the drawing. Such modifications are believed to be within the spirit and the scope of this invention.

I claim:

1. In the vapor phase conversion of hydrocarbons in a reaction zone in the presence of a metal halide catalyst wherein the resulting vaporous reaction product stream contains metal halide vapor and is passed in contact with a solid absorbent downstream of said reaction zone so as to absorb metal halide vapor thereon, the improvement which comprises condensing at least a portion of the hydrocarbon effluent in said product stream downstream of said solid absorbent and recycling resulting condensate in liquid form to said product stream upstream of said solid absorbent at a rate sufficient to lower the product stream temperature below the sublimation temperature of the metal halide.

2. The process of claim 1 including sensing the temperature of the effluent from the solid-absorbent contacting and regulating the flow rate of said liquid hydrocarbons into the product stream so as to maintain said temperature substantially at the desired level.

3. The process of claim 1 applied to the conversion of a normal paraffin.

4. The process of claim 3 wherein said metal halide is aluminum chloride and said temperature is maintained below about 220° F.

5. The process of claim 1 applied to the isomerization of normal butane to isobutane in contact with solid aluminum chloride.

6. The process of claim 5, wherein the temperature of said reaction product stream is lowered to within the range of 200° F. to 220° F.

7. A system for the catalytic conversion of hydrocarbons which comprises a reaction chamber charged with a metal halide catalyst; reactant material inlet means in one end portion of said reaction chamber; reaction product outlet means in the opposite end portion of said reaction zone; a guard chamber containing a solid absorbent material; first conduit means connecting said reaction product outlet of said reaction zone and said guard chamber; effluent outlet means from said guard chamber; an accumulator; second conduit means connecting said effluent outlet means from said guard chamber and said accumulator; cooling means operatively connected to said second conduit means; liquid outlet means from said accumulator; third conduit means connecting said liquid outlet means from said accumulator and said first conduit means, a flow-control valve in said third conduit means; and a temperature-controller sensitive to the temperature in said second conduit means and operatively connected to said flow-control valve.

8. The process of claim 7 including the regulation of the rate of flow of said condensate in response to variations in the temperature of the effluent stream from the solid absorbent to maintain said effluent stream at a relatively constant temperature.

9. In the vapor phase isomerization of normal butane to isobutane in a reaction zone in contact with aluminum chloride, wherein the resulting vaporous reaction product stream contains aluminum chloride vapor and is passed in contact with a solid absorbent downstream of said reaction zone so as to absorb aluminum chloride vapor thereon, the improvement which comprises condensing at least a portion of the butanes in said product stream downstream of said solid absorbent and recycling resulting condensate to said product stream upstream of said solid absorbent at a rate sufficient to lower the product stream temperature to a temperature below about 220° F.

10. The process of claim 9 wherein said product stream is cooled to a temperature in the range of 200 to 220° F.

References Cited in the file of this patent

UNITED STATES PATENTS

| | | |
|---|---|---|
| 2,368,733 | Watson | Feb. 6, 1945 |
| 2,403,181 | Jones | July 2, 1946 |
| 2,506,720 | Jones | May 9, 1950 |
| 2,531,294 | Pickell | Nov. 21, 1950 |
| 2,608,527 | Holland | Aug. 26, 1952 |